Oct. 23, 1962 K. M. TRAMPEL 3,060,330

THREE-LEVEL INVERTER CIRCUIT

Filed Feb. 2, 1961

INVENTOR
KURT M. TRAMPEL

BY Edward G. Fiorito

AGENT

United States Patent Office 3,060,330

Patented Oct. 23, 1962

3,060,330

THREE-LEVEL INVERTER CIRCUIT

Kurt M. Trampel, Poughkeepsie, N.Y., assignor to International Business Machines Corporation, New York, N.Y., a corporation of New York Filed Feb. 2, 1961, Ser. No. 86,773
5 Claims. (Cl. 307—88.5)

This invention relates to an inverter circuit, and more particularly to an inverter circuit for inverting a signal capable of residing in one of three voltage levels.

Most conventional binary computers operate with signals that can vary between two voltage levels, called the 1 and 0 voltage level. A problem arises in asychronous computers which used the conventional two voltage level binary signals. Asynchronous computers as described by R. K. Richards, Arithmetic Operations in Digital Computers, D. Van Nostrand Company, are computers where no "clock" pulses are used to initiate operations within the computer. In asynchronous computers, one operation is commenced as soon as the previous operation is completed. The problem occurs in determining when the previous operation is completed.

In asynchronous computers using the conventional two voltage level signals, this problem is easily overcome when the result of a computer operation is a one voltage level. In this case, the next computer operation can be initiated when the result of the previous computer operation changes from the 0 voltage level to the 1 voltage level. This problem is not so easily overcome, however, when the result of a computer operation is a 0 voltage level. In this case, the next computer operation cannot be initiated since there is no change in the result of the previous computer operation, the result remaining a 0 even after the previous computer operation has been completed.

The problem of determining when an operation has been completed in an asynchronous computer can be overcome by using a signal which can vary between three voltage levels, viz., a 1 voltage level, a 0 voltage level and a voltage level somewhere between the 1 and 0 voltage levels, called an N voltage level. In a computer using this three voltage level signal, when the result of a computer operation is a 0, the next computer operation can be initiated by the change from an N level voltage to a 0 level voltage. In like manner, when the result of a computer operation is a 1, the next computer operation can be initiated by the change from an N voltage level to a 1 voltage level.

In a computer using a three voltage level signal, the electrical circuitry is necessarily more complex than the circuitry in a computer using only a two voltage level signal. Thus, the feasibility of constructing a computer using a three voltage level signal is directly affected by the increased cost of the circuitry due to the added complexity of the circuitry. The present invention is directed to a new inverter circuit which is capable of inverting a three voltage level signal. Specifically, when this inverter circuit receives a signal residing in the 1 voltage level, it provides a signal output residing in the 0 voltage level. When it receives a signal residing in the 0 voltage level, it provides a signal output residing in the 1 voltage level. Finally, when it receives a signal residing in the N voltage level, it provides a signal output residing in the N voltage level.

In any computer, whether using a two or a three voltage level signal, a great number of inverter circuits are required. It is very important that the number of components used to construct the inverter circuit be reduced to a minimum in order to keep down the cost of the computer.

Accordingly, it is an object of the present invention to provide a new inverter circuit capable of inverting a three voltage level signal.

Another object of the present invention is to provide a new three level inverter circuit using a minimum number of components.

Frequently in computers the signals become weak or distorted during transmissions between circuits. When this happens, the voltage levels lose their tolerance and the signals can reside anywhere within a range of voltage values about the three voltage levels. An inverter which can accept such a weak or distorted signal and provide a sharp well defined output signal with close tolerances about the three voltage levels in an asset to the computer.

An additional object of the present invention is to provide a new three level inverter circuit capable of accepting a signal residing in voltage levels having loose tolerances and providing a sharp well defined output signal having close tolerances.

The foregoing and other objects, features and advantages of the invention will be apparent from the following more particular description of preferred embodiments of the invention, as illustrated in the accompanying drawings.

Figure 1:
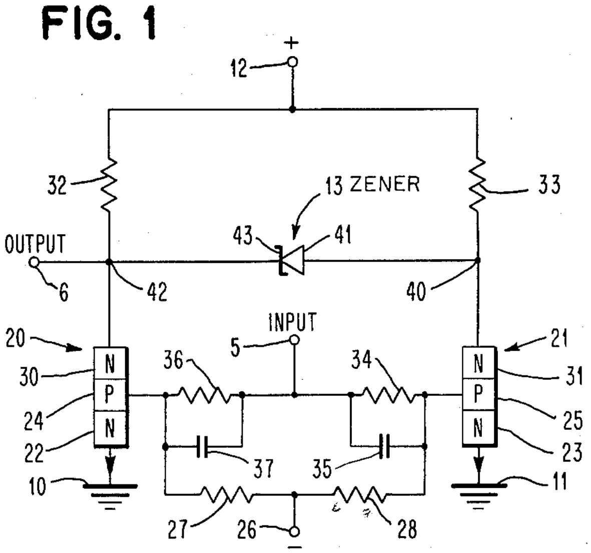
FIGURE 1 is a circuit diagram of a transistor three level inverter circuit embodying this invention.

In FIG. 1, a transistor embodiment of this invention is shown. The three voltage level input signal is applied to input terminal 5 and the inverted signal is provided at output terminal 6.

Figure 2:
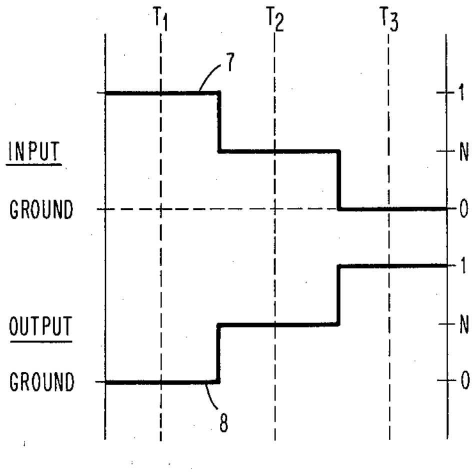
FIGURE 2 illustrates several waveforms useful in describing the operation of the circuit of FIGURE 1.

In FIG. 2, the waveform 7 illustrates a signal applied to the input terminal 5. The waveform 8 illustrates the signal provided on the terminal 6. According to the operation of this inverter circuit, at time $T_1$, the input signal resides at the 1 voltage level, while the output signal resides at the 0 voltage level. At time $T_2$, both the input and output signals reside at the N voltage level. At time $T_3$, the input signal resides at the 0 level, while the output signal resides at the 1 level. In this transistor embodiment, the 0 voltage level is assigned the voltage value of the grounds 10 and 11. The 1 voltage level is assigned a voltage value approaching the positive supply on terminal 12. The N voltage level is assigned a value equal to the voltage drop across the zener diode 13.

The transistors 20 and 21 used in this embodiment of the invention may be of the junction type. The emitters 22 and 23 are connected to grounds 10 and 11, respectively. The bases 24 and 25 are biased by the negative voltage supply on terminal 26 through resistors 27 and 28, respectively, so that the transistors 20 and 21 are normally in the nonconductive state. When the transistors 20 and 21 are in the nonconductive state, the output signal on terminal 6 approaches the voltage of the positive supply on terminal 12 connected to the collectors 30 and 31 through resistors 32 and 33, respectively. The input signal on terminal 5 is coupled to the base 25 through the resistor 34 and capacitor 35. The resistors 34 and 28 are designed so that, when the input signal resides in the 1 voltage level or the N voltage level, the transistor 21 conducts. The input signal on terminal 5 is coupled to the base 24 through resistor 36 and capacitor 37. The resistors 36 and 27 are designed so that the transistor 20 conducts only when the input signal resides in the 1 voltage level.

When the input signal resides in the 1 voltage level, both transistors 20 and 21 conduct and the voltage on the output terminal 6 approaches the voltage level of the ground 10. Thus, as shown in FIG. 2, the input waveform 7 at time $T_1$ resides at the 1 level, while the output waveform 8 resides at the 0 level. When the input signal resides at the 0 level, both transistors 20 and 21 are not conducting so that the signal on output terminal 6 approaches the voltage level of the positive supply on terminal 12. Thus, the input waveform 7 at time $T_3$ resides at the 0 level, while the output waveform 8 resides at the positive 1 level.

When the input signal on terminal 5 resides at the N level, transistor 21 conducts, while transistor 20 does not conduct. The voltage at node 40 approaches the voltage level of ground 11. The breakdown voltage of the zener diode 13 is chosen to equal the voltage difference between the 0 and N voltage levels. By connecting the node 40 to the anode 41 of zener diode 13, and the node 42 to the cathode 43, the voltage at node 42 can never exceed the voltage at node 40 by more than the breakdown voltage of the zener diode 13. Therefore, when the voltage at node 40 approaches the 0 level of ground 11, the voltage at node 42 resides at the N voltage level. As shown in FIG. 2, at time $T_2$, the input signal on terminal 5 resides at the N level, causing transistor 21 to conduct and transistor 20 not to conduct. Therefore, node 40 resides at the 0 voltage level and the output waveform 8 at terminal 6 connected to the node 42 resides at the N level.

The following is a table of values of resistance, capacitance, voltage supplies and zener diode breakdown voltage found to be suitable for operation of this circuit. These values are set forth by way of example only and the invention is not limited to them, nor any of them.

*Table*

| | | |
|---|---|---|
| Positive voltage supply, terminal 12 | v | +20 |
| Resistor 32 | K | 2.4 |
| Resistor 33 | K | 2.4 |
| Breakdown voltage zener diode 13 | v | 10 |
| Resistor 36 | | 560 |
| Resistor 34 | K | 15 |
| Capacitor 37 | pf | 33 |
| Capacitor 35 | pf | 33 |
| Resistor 27 | | 240 |
| Resistor 28 | K | 33 |
| Negative voltage supply, terminal 26 | v | −6 |

Figure 3:
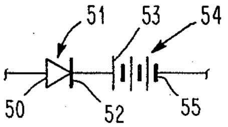
FIGURE 3 is a circuit diagram of alternative components used in the circuit of FIGURE 1.

Shown in FIG. 3 is an alternative pair of components that could be used in place of the zener diode 13. With the zener diode removed from the circuit, FIG. 1, the anode 50 of the diode 51 is connected to the node 42. The cathode 52 is connected to the positive terminal 53 of the battery 54. The negative terminal 55 is connected to the node 40. The voltage of the battery 54 is chosen to be equal to the difference in voltage between the 0 and N voltage level signals. When transistor 21 conducts and transistor 20 does not conduct, the diode 51 is forward biased and the battery 54 sets the voltage at node 42 at the N voltage level.

Whether the zener diode 13, or the diode 51 and battery 54 is used to maintain the voltage differential between nodes 40 and 42, a well defined voltage level at the output terminal 6 is provided when the transistor 21 conducts and the transistor 20 is not conducting. Thus, the tolerance of the N voltage level signal on input terminal 5 may vary considerably. So long as the transistor 21 is placed into conduction, a well defined output level is established by the differential voltage-maintaining means between the nodes 40 and 42.

In a similar manner, the one voltage level input signal on terminal 5 may vary in a loose tolerance range. So long as the transistors 20 and 21 are put in a state of conduction, the output signal on terminal 6 is maintained at a well defined 0 voltage level signal.

Finally, when the input signal on terminal 5 resides at the 0 voltage level, the tolerance at this level may vary considerably. So long as the transistors 20 and 21 are maintained in a nonconductive state, the output signal on terminal 6 approaches the well defined voltage of the positive supply on terminal 12.

A PNP transistor version of this invention can be readily constructed by merely reversing the polarity of all of the voltages disclosed about the reference of ground and by reversing the two connections of whichever differential voltage-maintaining means is chosen to be connected between the nodes 42 and 40.

While the invention has been particularly shown and described with reference to preferred embodiments thereof, it will be understood by those skilled in the art that the foregoing and other changes in form and details may be made therein without departing from the spirit and scope of the invention.

I claim:

1. Apparatus for inverting an input signal capable of residing in a first, a second, or a third voltage level comprising: two switching means, each capable of providing at its output terminal a signal corresponding to said first voltage level when conducting and a signal corresponding to said third voltage level when not conducting; circuit means connecting said input signal to said switching means so that both of said switching means conduct when said input signal resides in said third voltage level, one of said switching means conducts when said input signal resides in said second voltage level, and none of said switching means conduct when said input signal resides in said first voltage level; differential voltage-maintaining means connected between said output terminals for maintaining a predetermined voltage differential between said output terminals when only one of said switching means is conducting.

2. Apparatus for inverting an input signal capable of residing in a first, a second, or a third voltage level comprising: two switching means, each capable of providing at its output terminal a signal corresponding to said first voltage level when conducting and a signal corresponding to said third voltage level when not conducting; circuit means connecting said input signal to said switching means so that both of said switching means conduct when said input signal resides in said third voltage level, one of said switching means conducts when said input signal resides in said second voltage level, and none of said switching means conduct when said input signal resides in said first voltage level; a zener diode connected between said output terminals so that a predetermined voltage differential is maintained between said output terminals when only one of said switching means is conducting.

3. Apparatus for inverting an input signal capable of residing in a first, a second, or a third voltage level comprising: two transistors, each capable of providing at its output terminal a signal corresponding to said first voltage level when conducting and a signal corresponding to said third voltage level when not conducting; circuit means connecting said input signal to said transistors so that both of said transistors conduct when said input signal resides in said third voltage level, one of said transistors conducts when said input signal resides in said second voltage level, and none of said transistors conduct when said input signal resides in said first voltage level; a zener diode connected between said output terminals so that a predetermined voltage differential is maintained between said output terminals when only one of said switching means is conducting.

4. Apparatus for inverting an input signal capable of residing in a first, a second, or a third voltage level comprising: two transistors, each having a base, a collector and an emitter terminal; circuit means connecting each emitter terminal to a voltage supply corresponding to said first voltage level; two resistor means connecting each collector to a voltage supply corresponding to said third voltage level; impedance means connecting said input signal to said base terminals so that both of said transistors conduct when said input signal resides in said third voltage level, one of said transistors conducts when said input signal resides in said second voltage level and none of said transistors conduct when said input signal resides in said first voltage level; a zener diode connected between said collector terminals so that a predetermined voltage differential is maintained between said collector terminals when only one of said transistors conducts.

5. Apparatus for inverting an input signal capable of residing in a first, a second, or a third voltage level comprising: two transistors, each having a base, a collector, and an emitter terminal; circuit means connecting each emitter terminal to a voltage supply corresponding to said first voltage level; two resistor means connecting each collector to a voltage supply corresponding to said third voltage level; impedance means connecting said input signal to said base terminals so that both of said transistors conduct when said input signal resides in said third voltage level, one of said transistors conducts when said input signal resides in said second voltage level and none of said transistors conduct when said input signal resides in said first voltage level; a diode and a battery connected between said collector terminals so that a predetermined voltage differential is maintained between said collector terminals when only one of said transistors conducts.

References Cited in the file of this patent

UNITED STATES PATENTS 2,932,796 Von Kummer et al. ------- Apr. 2, 1960